United States Patent [19]
Carey et al.

[11] Patent Number: 6,092,075
[45] Date of Patent: Jul. 18, 2000

[54] FRAMEWORK FOR BUSINESS APPLICATIONS USING CACHED AGGREGATE AND SPECIFICATION KEY

[75] Inventors: James Carey, Rochester, Minn.; Brent Carlson, Sollentuna, Sweden; Bradley Fawcett, Byron, Minn.; Timothy Graser, Rochester, Minn.; Wilfried Lesnik, Vienna, Austria; Anders Nilsson, Hagan, Norway

[73] Assignee: International Business Machines Corporation, Armonk, N.Y.

[21] Appl. No.: 09/038,349

[22] Filed: Mar. 11, 1998

[30] Foreign Application Priority Data

Aug. 14, 1997 [EP] European Pat. Off. .............. 97114038

[51] Int. Cl.[7] ...................................................... G06F 17/30

[52] U.S. Cl. ........................................... 707/102; 707/103

[58] Field of Search ...................................... 707/102, 103

[56] References Cited

U.S. PATENT DOCUMENTS

| | | | |
|---|---|---|---|
| 5,594,892 | 1/1997 | Bonne et al. | 395/500.43 |
| 5,649,180 | 7/1997 | Danno et al. | 364/DIG. 1 |
| 5,765,142 | 6/1998 | Alfred et al. | 705/26 |
| 5,845,289 | 12/1998 | Baumeister et al. | 707/103 |
| 5,873,093 | 2/1999 | Williamson et al. | 707/103 |
| 5,884,304 | 3/1999 | Davis, III et al. | 707/4 |
| 5,924,094 | 7/1999 | Sutter | 707/10 |

*Primary Examiner*—Wayne Amsbury
*Attorney, Agent, or Firm*—Owen J. Gamon

[57] ABSTRACT

The present invention relates to a method of developing a software system using Object Oriented Technology and frameworks for developing a business application. The present invention is applicable in the technical field of application development of software systems, e.g. for a business application as Financial or Logistic and Distribution, wherein it is the purpose of frameworks to provide significant portions of the application that are common across multiple implementations of the application in a general manner, easy to extend for specific implementation.

14 Claims, 6 Drawing Sheets

FRAMEWORK FOR BUSINESS APPLICATIONS USING CACHED AGGREGATE AND SPECIFICATION KEY

The present application is related to the following commonly assigned co-pending applications filed on the same date as the present application, each of which is herein incorporated by reference:

U.S. Ser. No. 09/038,024 by Kathryn Bohrer et al., entitled "A Method of Developing a Software System Using Object Oriented Technology", now pending;

U.S. Ser. No. 09/038,352 by Brent Carlson et al., entitled "A Method of Using Decoupled Chain of Responsibility", now pending;

U.S. Ser. No. 09/038,351 by James Carey et al., entitled "Framework for Business Applications Providing Financial Integration", now pending;

U.S. Ser. No. 09/038,025 by James Carey et al., entitled "Software Business Objects in a Multi-level Organizational Structure", now pending;

U.S. Ser. No. 09/041,114 by Brent Carlson et al., entitled "Method of Error Handling in a Framework", now pending; and U.S. Ser. No. 09/038,381 by Anders Nilsson, entitled "A Method of Locating Software Objects in Different Containers", now pending.

FIELD OF THE INVENTION

The present invention relates to a method of developing a software system using Object Oriented Technology and frameworks for developing a business application.

DESCRIPTION OF THE RELATED ART

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem. Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non object oriented ways of developing software, Object Oriented Technology comprises and uses preengineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library". A class library is simply a collection of several classes stored together in a special filing format called a library.

In Object Oriented Technology an "object" is a self-contained piece of software consisting of related data and procedures. Data means information or space in a computer program where information can be stored, e.g. a name or an inventory part number. Procedures are parts of a program that cause the computer to actually do something, e.g. the parts of a program which perform calculations or the part of a program that stores something on a computer disk. In Object Oriented Technology, an object's procedures are called "methods".

The concept of an object being a self-contained piece of software having data and procedures inside itself is a new way of developing software. In non object oriented software, most of the data for an entire program is often grouped together near the beginning of the program, and the procedures then follow this common pool of data. This conventional method worked okay for smaller programs, but as soon as a piece of software started to grow and become somewhat complex, it become increasingly difficult to figure out which procedures were using which data. This made it quite difficult and expensive to debug or change traditional software programs.

In Object Oriented Technology it is generally easier to debug, maintain, and enhance object oriented software. The most popular object oriented programming languages are probably "C++", "JAVA", and "Smalltalk". The concept that both data and methods are contained inside an object is called "encapsulation". Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used communicate the concept that one object can inherit part of its behavior and data from another object, e.g. since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g. whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, maintenance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology the term "framework" is used to describe a reusable set or collection of classes which work together to provide a commonly needed piece of functionality not provided by any of the individual classes inside the framework. Thus a framework defines a specific way in which multiple objects can be used together to perform one or more tasks which no single object performs. Further words, a framework is a reusable, predefined and preengineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper". Frameworks can be regarded as a group of software objects which contain a technical foundation for a software application. For example in the business field of Financial, Logistic and Distribution or Production. Although a framework represents a skeleton of a software application, usually a framework is not an executable software program.

E. GAMMA et al: "Design Patterns: elements of reusable object-oriented software", Addison-Wesley, 1995, ISBN 0-201-63361-2, gives a useful introduction to Object Oriented Technology in general and to design pattern more specifically, in particular with regard to the present invention.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore applications have to provide integration solutions with respect to installed software.

These flexible representations need to have a means of specifying that they are limited to a set or to a particular sub-set of the non-uniform items being used together. For example, if an item has values "A", "B", "C", "D", and "E", it may be useful to cache items of interest for all values or it may be useful to cache items of interest for values "A", "B", or "C" only. In addition, these specifications must indicate if they contain only those items specified, or all items, with those not specified lumped together (these are referred to as incomplete and complete respectively). They must also be able to determine if a set of non-uniform items are contained in their specification and be able to determine their relationship (superset, subset, or none) with another specification. For example if you have a complete set of cached balances for a particular specification and you need them for another specification, you must be able to ask if the needed specification is a subset of the existing specification and, if it is, derive the needed set of cached balances from the set of cached balances associated with the existing specification.

This aspect of frameworks supporting flexible representations of a set of non-uniform items has been addressed in the prior art by the creation of an abstraction for working with the non-uniform items, called a keyable, and an abstraction for collecting them together so they can be worked with as a group, called a key. Thus a key consists of a set of keyables. A keyable handles a particular item. One keyable's item may be non-uniform with any or all of the other keyables. Keys support comparision between itself and other keys by comparing the keyables in the same position. Each keyable supports equals. Generic keyables can be created for those items that support equals (or can be generically compared).

The user of the key must define and maintain the key such that the correct keyables are put into the correct position. This is done differently depending on the particular usage of the key. This means, that the usage of the keys can remain changed as the number of keyables is changed. Only the code which builds the key need to be modified.

The simplest form of a key is an Access Key. An Access Key is made up of Access Keyables. An Access Keyable is used to represent a specific value of an item. An Access Key can be used as the key in a map to map from some set of items to a particular object. For example to map from a particular Product and Warehouse pair to the balance (number on hand) of that product in that warehouse. The Access Key can be used by itself, e.g. when all possible values of each keyable are allowed.

The concept of Access Key is disclosed in the copending patent application "Access Key Objects", application Ser. No. 09/007,429, filed Jan. 15, 1998, which claims priority to German application number 97100556.6, which was filed on Jan. 16, 1997.

Aggregation of large amounts of data for specific selection criterion is a slow process. To alleviate this problem the results of the aggregation are often kept and maintained, e.g. cached. This cached data must be efficiently maintained and must provide a means for creating Aggregates that are a subset of an existing maintained aggregation. This must be done in a manner flexible enough to allow the selection criterion to be easily modified and additional criterion to be easily added.

Within the accompanying figures, representation standards for classes, objects, relationships etc. are used at least partly according to Grady Booch: "Object-Oriented Analysis and Design with Applications", second edition, The Benjamin/Cummings Publishing Company, Ind., Redwood City, Calif., USA.

SUMMARY OF THE INVENTION

It is an object of the present invention to provide a technical foundation for the development of software applications using Object Oriented Technology which overcomes the above discussed problems.

It is a further object of the present invention to efficiently maintain data resulting from aggregation of large amounts of data for specific selection criterion. Furthermore it is an object to provide a means for creating aggregates that are a subset of an existing maintained aggregation.

It is a further object of the invention to enhance the flexibility to represent a set on non-uniform items used together to retrieve an item of interest.

The present invention solves this object with methods and apparatus as laid down in enclosed independent claims. Particular embodiments of the present invention are presented in the respective dependent claims.

Frameworks also need to support flexible representation of a set of non-uniform items used together to retrieve an item of interest. Examples of this are caching of items associated with a set of non-uniform items, such as cached balances, and mapping from one domain's non-uniform items, such as Logistics Products and Warehouses, to another domain's items, such as General Ledger's Analysis Groups and Analysis Codes, to allow flexible data transfer.

In particular, the present invention provides a Specification Key used for grouping Keys, e.g. Access Keys. A Specification Key consists of a set of Specification Keyables. Each Specification Keyable specifies the particular keyable values that are valid for that keyable position in an associated Access Key. For example a Specification Key can have a Specification Keyable for Product, which specifies Products "A" and "B", thus only Access Keys with a Access Keyable of either "A" or "B" in that position are within the specification. Specification Keys can be either complete or incomplete. A complete Specification Key will act as if there is an additional entry for each keyable that is "everything else". In our example, it would specify Products "A" and "B" and "not A or B" would be implied. Special Specification Keys are provided to indicate that the keyable is not used in the specification or that all values are specified ranges, Sets and a mixture of both are supported.

Specification Keys support:
Asking if they include a particular Access Key
Converting, if possible, an Access Key to be included in the Specification Key
Comparision with other Specification Keys (equals, isSubset, and isSuperset)

Thus a Specification Key can be used to indicate which Access Keys are valid or of interest for a particular usage. An example of this is using a Specification Key to control the Access Keys in a map. For retrieval the Specification Key can be asked if the Access Key is included in the Map (allowing the map to have a default for entries not yet added to the map). For update the Specification Key can be used to convert an Access Key to the correct form for the Map (removing unused keyables, or converting non-specified Specification Keyables to a common "not in specification" keyable).

Although the primary purpose of specification keys is to specify the limitations on Access Keys in a map, they are also used independently of maps.

For example a Specification Key can be used as the key for a map to discounts. The Specification Key contains a keyable that is a date range, which is when the discount is valid. An Access Key containing the date to look for the discount for is used to ask which Specification Keys include the Access Key and thus what discounts are available. When more restrictions on the discounts are added, such as "customer type", the key can have a keyable added and only the code building the keys would need to be modified. Further a specification key containing a date range could be used, via subset, to find discounts applicable over an entire date range.

In particular, the present invention provides a way of creating working with, manipulating and maintaining cached balances. It allows customization of the criterion used and the particular item or items being cached. Thus, for example, inventory can be cached based on warehouse and product as a simple value or as a list of all the inventory changes.

DETAILED DESCRIPTION

Figure 1:
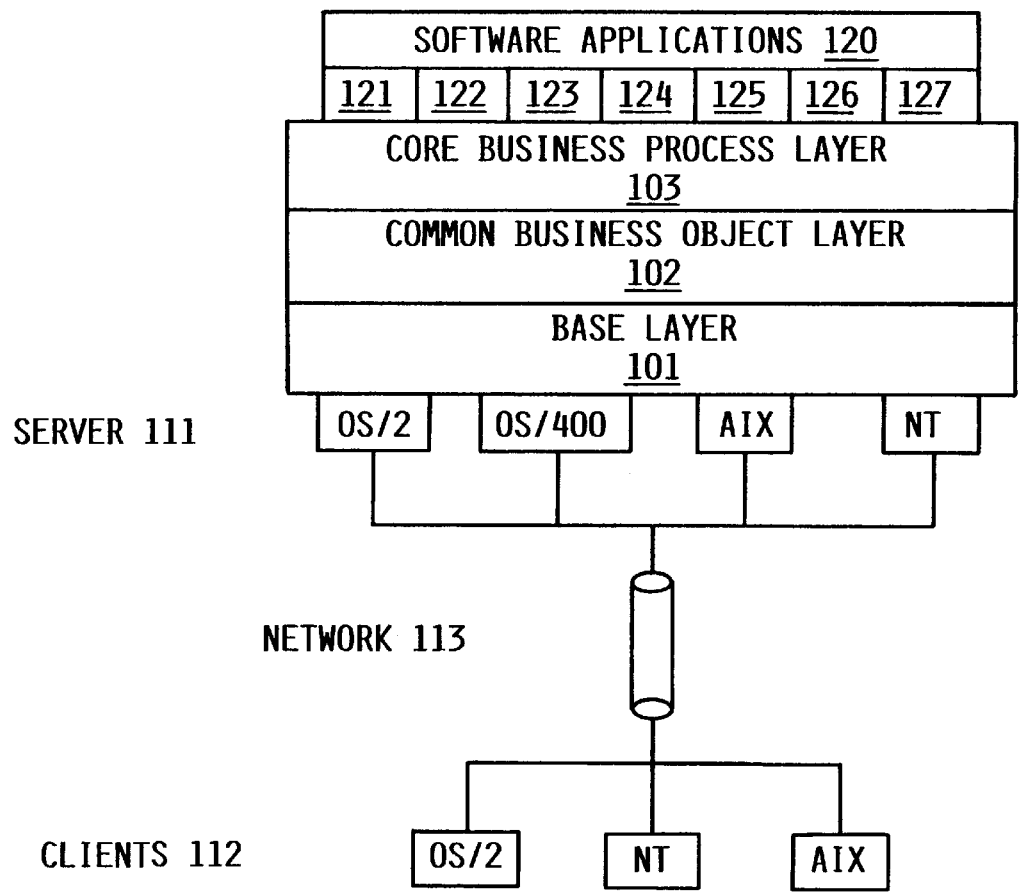
FIG. 1 shows a four layer schema from which software application can be developed using the present invention.

Developing software applications using the subject of the present invention as a development tool can be regarded as built up of four layers as shown in FIG. 1.

The lowest layer is the base layer 101. The base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure form the software application developer. The Base layer 101 can be regarded as a kind of lower middleware necessary for the application of the Object Technology above it using the interface functionality provided by the Base layer 101.

Above the Base layer 101 there is a layer comprising Common Business Objects 102. This Common Business Object layer 102 provides a large number of objects which perform functions commonly needed within a business application, e.g. date and time, currency, address, units of measure, and calendar. These Common Business Objects represent the building blocks from which software application developers can select and create business applications, e.g. these Common Business Objects can be copied and extended to perform new functions as for example the date and time object can be extended to handle the Chinese calendar.

The layer 103 above the Common Business Objects layer 102 already comprises Core Business Processes and can be regarded as the Core Business Process layer 103. Although layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which—although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g. Warehouse Management. The resulting framework is constructed in a way to contain commonly used functions as well as to be easy to extend.

On top of the above described three layer model the application software is located, created by the software application developer and representing executable code. It is the choice of a software application developer whether to use only the base layer 101, the base layer 101 and the Common Business Object layer 102, or all three layers 101, 102, and 103 for the development of his software application. In every case he has to develop a remaining part of the application by himself and therefore every resulting software application program will be a completely unique product.

It has to be noted that the subject of the present invention is represented within the three layer model 101, 102, and 103 and is not represented by the executable code of the software application 121 developed using the present invention.

Figure 2:
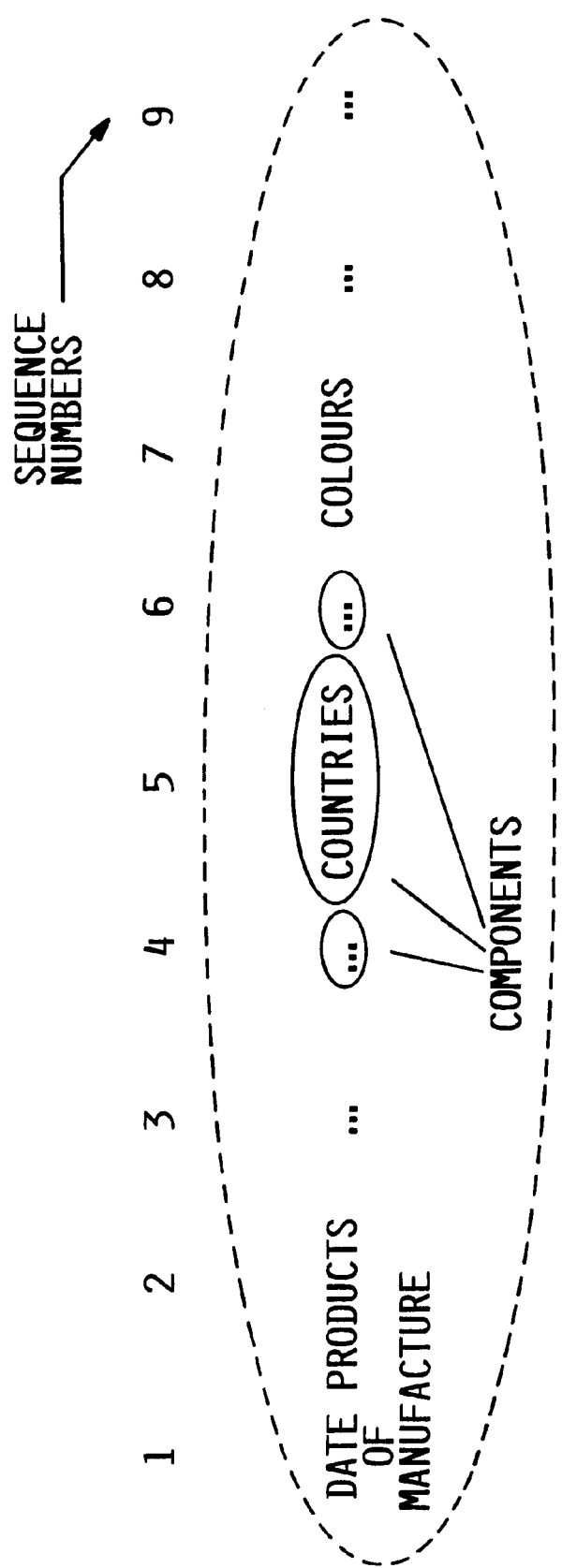
FIG. 2 shows a given access key which may be provided by the framework provider (prior art).

FIG. 2 (prior art) shows a given access key which may be provided by the framework provider or the solution provider. This given access key is a default key which includes all possible components for e.g. a vehicle manufacturing company. In the example of FIG. 2, the given access key includes nine different components. Of course, a given access key may also provide more or less than nine components. Among others, the nine components in FIG. 2 are "date of manufacture", "products countries" and "colours". These nine components are ordered in a fixed sequence. For the purpose of clarity, the sequence is shown by sequence numbers, However, such sequence numbers do not have to exist in an actual computer system. In FIG. 2, the components "date of manufacture", "products", "countries" and "colours" have the sequence numbers 1, 2, 5 and 7. The other positions of the given access key are filled with other components which are not characterized in further detail.

Figure 3:
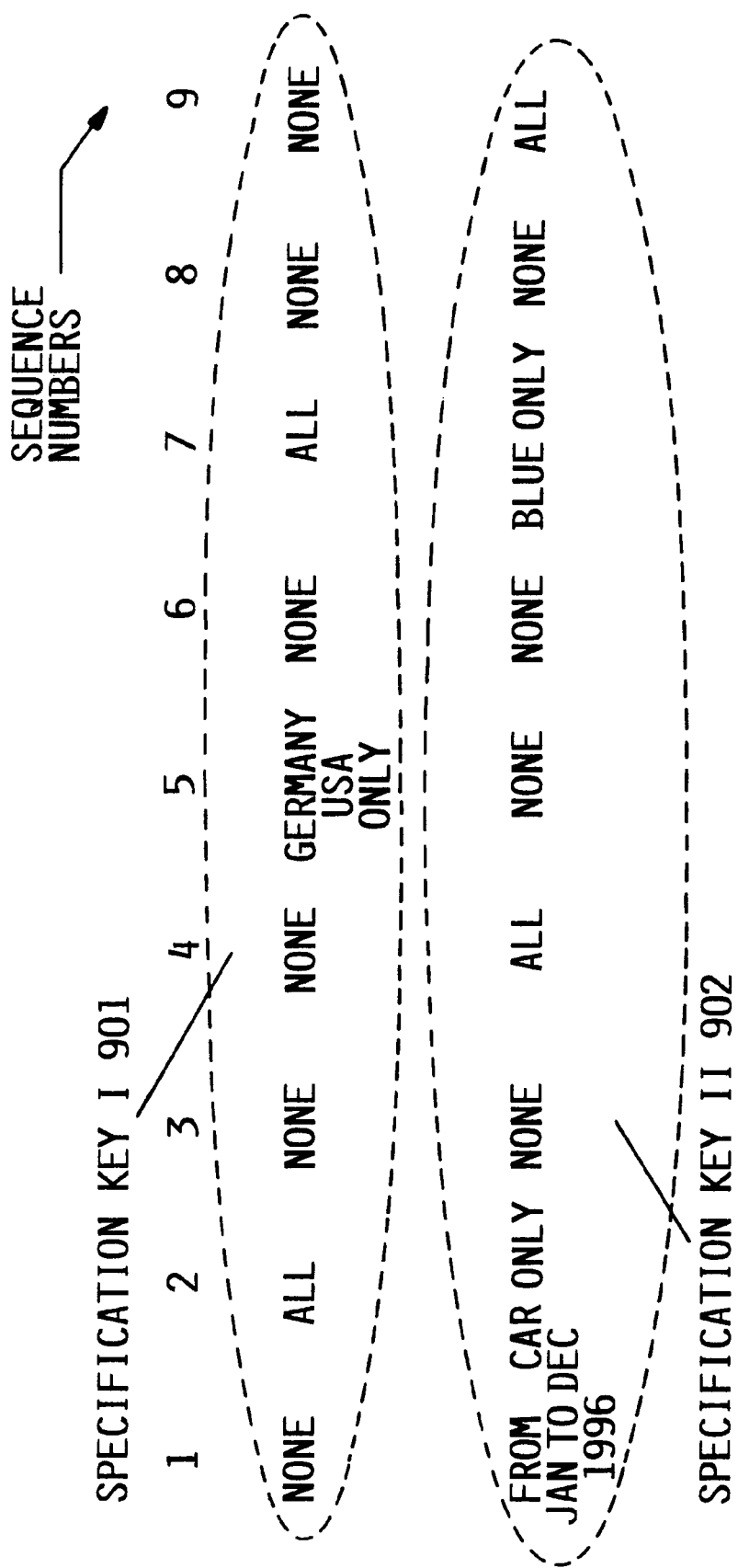
FIG. 3 shows two specification keys according to the present invention.

In FIG. 3, two specification keys are shown. Each of these specification keys has the same fixed sequence and therefore the same sequence numbers as the given access key in FIG. 2. Again, these sequence numbers do not have to exist in an actual computer system. They are only introduced for the purpose of clarity.

Each of the specification keys shown of FIG. 3 includes values like "none" "all", " . . . only", "from . . . to" and so on. With these values, it is possible for an application to select specific entries of each of the listed components of the given access key of FIG. 2. Then, the selected entries form a desired access key which is specialized for the respective application.

The value "none" means that none of the entries of the respective component shall be included in the desired access key. The value "all" has the meaning that all of the entries of the respective component shall be included in the desired access key. The value " . . . only" has the consequence that only those entries of the respective component which are mentioned in connection with the value are included in the desired access key. The value "from . . . to . . . " results in only those entries of the respective component which fall within the specified range being included in the desired access key.

For example, specification key I 901 in FIG. 3 selects all entries of the components with the sequence numbers 2 and 7, i.e. all entries of the components "products" and "colours". Furthermore, the entries "Germany" and "USA" are selected from the component "countries" with the sequence number 5. All other components are not selected. This has the consequence, that a desired access key is created with respect to the sequence of the components and with respect to the entries of the components except that the component "countries" does not include the entry "Japan".

With the help of specification key II 902 shown in FIG. 3, a desired access key is created which includes all entries between January 1996 and December 1996 for the component "date of manufacture", all entries of the components with the sequence numbers 4 and 9, furthermore the entries "cars" and "blue" of the components "products" and "colours" of the sequence numbers 2 and 7, and no entries of the components with the sequence numbers 3, 5, 6, and 8.

The specification key is therefore the link between the given default access key and the desired specific access key. The specification key may be created with many components by an application so that, at the end, the user or application is able to compose that desired access key which is best suitable for their respective use of the application. For example the application provides the ability to use the components "products", "countries", etc. but the user determines which, if any, they are interested in.

With respect to the aggregation problem, it is , for example, desired that inventory balances be able to be aggregated based on the product, stock type, warehouse, and lot. Any combination of these can be specified. Given:

products "A", "B", and "C",
stock type "1" and "2",
warehouses "alpha" and "beta", and
lots "red", "green", and "blue".
Assume the following balances are cached:
1. For all products in all lots.
2. For product "A" in all lots.
3. For product "A" in warehouse "beta".
Then the following balances could be condensed from the above rather than re-aggregating them:
For all products (from 1)
For product "A" (from 1, 2 or 3)
For warehouse "beta" (from 3)
For all lots (from 1., note 2. and 3. can not be used since 2. is only for product "A" and 3. does not have lot information)

The most typical type of Aggregate is a balance, however, a set of items might be aggregated. For example, the aggregate could be the set of products in a warehouse. The application developer selects the type of aggregate by introducing a subclass of the framework cached balance class into the application. This subclass supports the interface used to aggregate updates to the set.

The solution to the aggregation problem is to use a "Cached Balance Set" which uses a Specification Key to manage a map from Access Keys to the cached aggregate, i.e. the subclass of the framework cached balance class provided by the application developer, and to use a "Cached Balance Set Collection" which maintains a map from Specification Key (from the Cached Balance Set) to Cached Balance Set.

Figure 4:
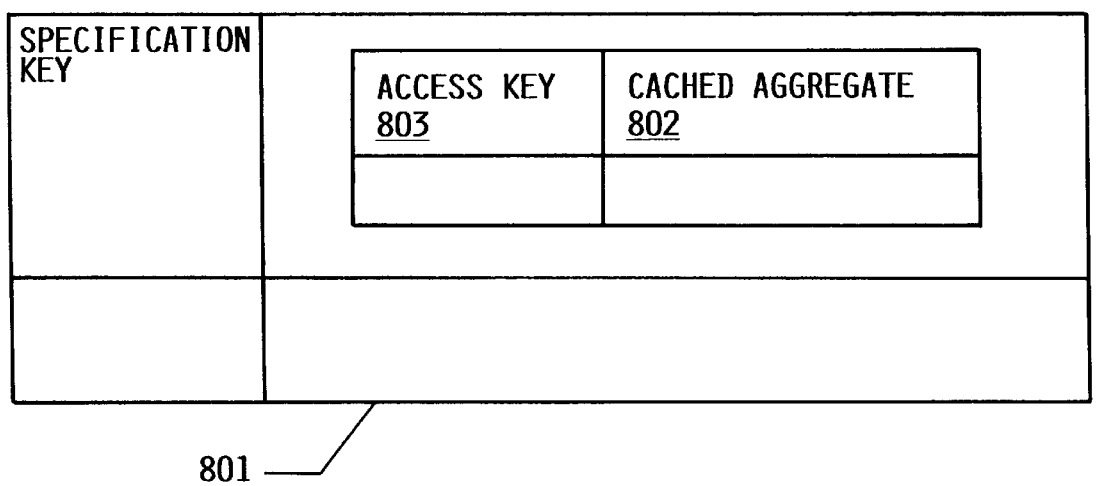
FIG. 4 shows the cached balance set collection structure.

As shown in FIG. 4, the Cached Balance Set 801 contains the aggregations 802 for those Access Keys 803 related to its Specification Key. The content of these keys is managed externally to the Cached Balance Set 801. They are defined to contain all of the supported selection criteria as keyables. This does not mean that all of the selection criteria must be used. This is controlled by how the Specification Key is built, e.g. the keyable can be an Ignored keyable, which means this specification does not care about that keyable. In the example this means that the Key positions could be defined as:

1. product,
2. stock type,
3. warehouse, and
4. lot.

The cached balances described in the problem would be defined by the following keyables in the Specification Key:

1. ALL, Ignored, Ignored, ALL,
2. "A", Ignored, Ignored, ALL, and
3. "A", Ignored, "beta", Ignored.

where ALL indicates that all values are specified.

Figure 5:
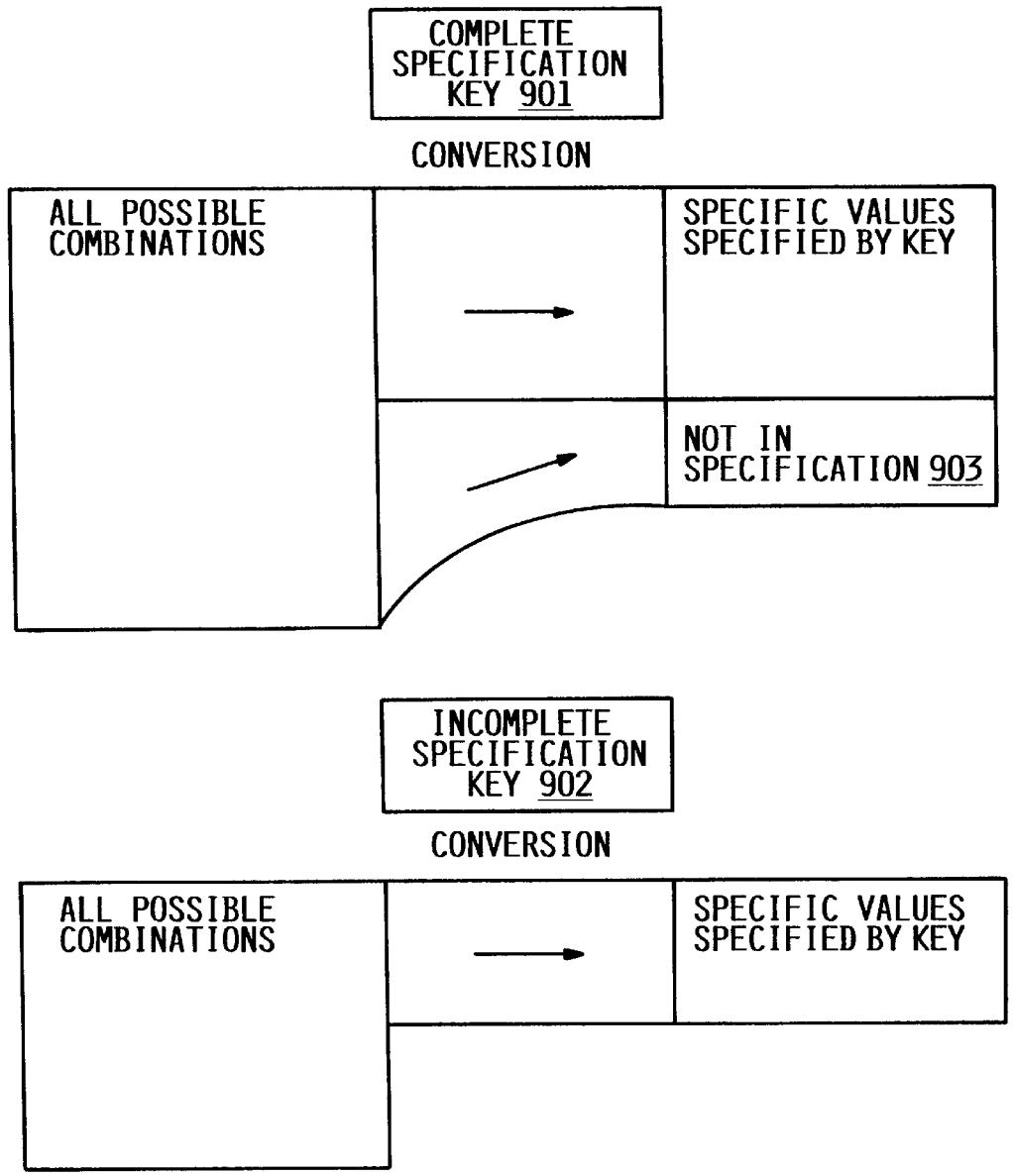
FIG. 5 shows the complete/incomplete character of a specification key for a cached balance set.

As shown in FIG. 5, the Specification Key for a Cached Balance Set can be either complete 901 or incomplete 902. An incomplete key 902 means that the balances are only kept for the items specified in the specification. A complete key 901 means that balances are kept for all values, and that those items not specified in the specification are kept with a "not in specification" keyable 903 in that location. For example, given a Specification of "A", Ignored, "beta", Ignored, being incomplete would mean only the balance for "A", NoValueNeeded, "beta", NoValueNeeded would be kept, and being complete would mean that the following balances would be kept:

1. "A", NoValueNeeded, "beta", NoValueNeeded,
2. notInSpecification, NoValueNeeded, "beta", NoValueNeeded,
3. notInSpecification, NoValueNeeded, notInSpecification, NoValueNeeded, and
4. "A", NoValueNeeded, notInSpecification, NoValueNceded The Cached Balance Set Collection manages a set of related Cached Balance Sets. It allows determination of what Cached Balances Sets exist and which, if any, would be best to condense to a requested Cached Balance Set or balance. The client simply requests the balance or Cached Balance Set from the Cached Balance Set Collection. If the requested item is available or can be calculated, the requested item is returned.

For example, if each of the assumed Cached Balance Sets above were included in a Cached Balance Set Collection, any of the Cached Balance Sets listed above could be retrieved from the Cached Balance Set Collection.

A particular balance (Aggregate) is updated and retrieved by using an Access Key which has the same layout as the Specification Key. Retrieval is achieved by asking the Cached Balance Set Collection for a Cached Balance Set that either includes the Access Key exactly or includes it because it is a has a superset of it. In the first case, the Access Key is used directly on the Cached Balance Set to retrieve the balance (Aggregate). In the second case, the entries in the Cached Balance Set that are a superset of the requested Access Key are retrieved and added (aggregated) to return the result. Note that condensing to a balance can always be done with complete Cached Balance Sets that are a superset, however, incomplete Cached Balance Sets may not contain all of the data required to do the condensation, so they will not normally be used as a source for condensation, although with appropriate checks they can be used.

Figure 6:
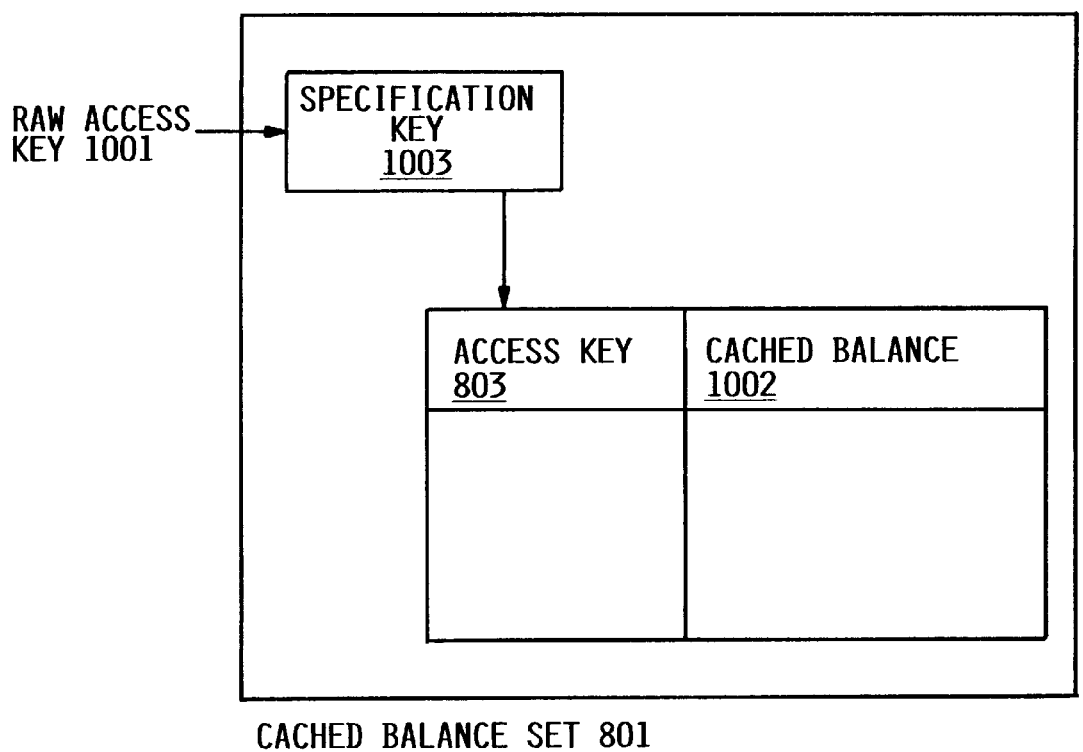
FIG. 6 shows access key conversion using specification key for use with cached balance set associated with specification key.

As shown in FIG. 6, updating is achieved by creating an Access Key 1001 with all keyables filled in, giving it and the value to be added to the balance (aggregated) to the Cached Balance Set Collection. The Collection updates each of its Cached Balance Sets 801. Each Cached Balance Set 801 contains a Specification Key 1003, which convert the Access Key 1001 for use with the set, if it is included in their specification. Note that a complete Cached Balance Set, i.e. a Cached Balance Set whose specification key is complete, will always include the Access Key 1001 in its specification, since it will convert keyables that are outside of the specification into "not in specification" keyables. Incomplete Cached Balance Sets will not do this and thus will have Access Keys which cannot be converted.

What is claimed is:

1. A framework for developing a software system in a computer system, said framework comprising:

a specification key comprising specification keyables, wherein said specification keyable isolates said specification key from specific components and said specification keyable can specify none, one, many or all specific components, allowing said specification key to be used as a more powerful access key, wherein the specification key specifies a group of access keys and wherein each said specification keyable specifies particular access keyable values that are valid for a related keyable position in said access key associated with said specification key; and a map from an access key to an object, where the specification key is associated with the map and used to control what access keys are used within the map.

2. The framework according to claim 1, wherein said specification key is complete.

3. The framework according to claim 1, wherein said specification key is incomplete.

4. The framework according to claim 1, wherein relationships of equality, subset, and superset between said specification keys can be determined.

5. The framework according to claim 4, wherein said relationships between said specification keys are applied to a second associated map for generating said second map associated with a specification key from a third map associated with a specification key that is a superset of said specification key said second map to be generated is associated with.

6. The framework according to claim 1, wherein relationships between said specification key and said access key can be determined, and wherein the relationships determine if a particular access key is contained within said specification key, or converting a particular access key so that it is included in a particular specification key.

7. The framework according to claim 6, wherein using said conversion results in an access keyable of "Not in Specification" when said related keyable position in said specification key does not specify said component in said access keyable being converted.

8. The framework according to claim 1, wherein using said access key with said specification key, an access keyable "No value needed" is used when a related keyable position in said specification key indicates "None".

9. The framework according to claim 1, wherein
said specification key is provided for enabling a user or application to specify a portion or portions of a given access key to use in a desired access key.

10. A framework for developing a business application in a software system, said business application providing aggregation of large amounts of data for a specific selection criterion using access keys and a specification key, wherein said framework comprises:

a cached balance set, said cached balance set uses said specification key to manage a map from said access keys to a cached aggregate, wherein said cached balance set supports condensation to cached balance sets whose associated specification key is a subset of a source specification key; and a cached balance set collection, wherein said cached balance set collection maintains a map from said specification key to said cached balance set.

11. The framework according to claim 10, wherein
said cached balance set collection works with contained cached balance sets via relationships between a provided specification key or access key and said specification keys associated with said contained cached balance sets.

12. The framework according to claim 10, wherein
said cached balance set contains said aggregations for those of said access key related to its specification key.

13. The framework according to claim 10, wherein
a content of said keys is managed externally to said cached balance set.

14. The framework according to claim 10, wherein
a user defines a concrete balance value class to store and keep in cached balance set.

* * * * *